United States Patent
Feng et al.

(10) Patent No.: US 12,361,186 B2
(45) Date of Patent: Jul. 15, 2025

(54) INTEGRAL REINFORCEMENT DESIGN METHOD FOR EXTERNAL FRAME-BRACE BASED ON RANDOM CAPABILITY SPECTRUM

(71) Applicant: Southeast University, Nanjing (CN)

(72) Inventors: De-Cheng Feng, Nanjing (CN); Xu-Yang Cao, Nanjing (CN); Gang Wu, Nanjing (CN)

(73) Assignee: Southeast University, Nanjing (CN)

( * ) Notice: Subject to any disclaimer, the term of this patent is extended or adjusted under 35 U.S.C. 154(b) by 10 days.

(21) Appl. No.: 18/588,156

(22) Filed: Feb. 27, 2024

(65) Prior Publication Data
US 2024/0303385 A1    Sep. 12, 2024

(30) Foreign Application Priority Data
Mar. 8, 2023 (CN) .......................... 202310218967.6

(51) Int. Cl.
*G06F 30/13* (2020.01)
*G06F 30/20* (2020.01)
*G06F 119/14* (2020.01)

(52) U.S. Cl.
CPC .............. *G06F 30/13* (2020.01); *G06F 30/20* (2020.01); *G06F 2119/14* (2020.01)

(58) Field of Classification Search
CPC ....... G06F 30/13; G06F 30/20; G06F 2119/14
See application file for complete search history.

(56) References Cited

U.S. PATENT DOCUMENTS

2012/0310607 A1* 12/2012 Liu .................. G01V 1/003
703/1

OTHER PUBLICATIONS

Cao XY, Wu G, Feng DC, Wang Z, Cui HR. Research on the seismic retrofitting performance of RC frames using SCâPBSPC BRBF substructures. Earthquake Engineering & Structural Dynamics. Jul. 10, 2020;49(8):794-816. (Year: 2020).*

Manfredi, Vincenzo, Giuseppe Santarsiero, Angelo Masi, and Giuseppe Ventura. 2021. "The High-Performance Dissipating Frame (HPDF) System for the Seismic Strengthening of RC Existing Buildings" Sustainability 13, No. 4: 1864. https://doi.org/10.3390/su13041864 (Year: 2021).*

(Continued)

*Primary Examiner* — Eunhee Kim
(74) *Attorney, Agent, or Firm* — Hemisphere Law, PLLC; Zhigang Ma

(57) ABSTRACT

An integral reinforcement design method of an external frame-brace based on a random capability spectrum is provided, and the reinforcement design method includes: evaluating an original structure before reinforcement by using a random capability spectrum method; performing a reinforcement analysis on an external frame-brace sub structure by using the random capability spectrum method to obtain a reinforced structure; and performing a reinforcement verification on the reinforced structure by using the random capability spectrum method. A performance based integral reinforcement design of the external frame-brace sub structure is achieved through considering uncertain factors, as well as capability spectrums and demand spectrums before and after the reinforcement, and converting the integral structure to equivalent single degree of freedom to obtain performance points.

7 Claims, 11 Drawing Sheets

(56) References Cited

OTHER PUBLICATIONS

Cao XY, Wu G, Feng DC, Wang Z, Cui HR. Research on the seismic retrofitting performance of RC frames using SC-PBSPC BRBF substructures. Earthquake Engineering & Structural Dynamics. Jul. 10, 2020;49(8):794-816. (Year: 2020).*

Manfredi V, Santarsiero G, Masi A, Ventura G. The High-Performance Dissipating Frame (HPDF) System for the Seismic Strengthening of RC Existing Buildings. Sustainability 2021, 13, 1864. (Year: 2021).*

Jidong Liang et al., Pushover analysis of energy dissipation and seismic reduction reinforcement in Beijing hotel, Engineering Mechanic, 2003, pp. 380-383.

CNIPA, Notification of First Office Action for CN202310218967.6, Mar. 5, 2024.

Hohai University (Applicant), Reply to Notification of First Office Action for CN202310218967.6, w/ (allowed) replacement claims, Mar. 13, 2024.

CNIPA, Notification to grant patent right for invention in CN202310218967.6, Apr. 1, 2024.

* cited by examiner

INTEGRAL REINFORCEMENT DESIGN METHOD FOR EXTERNAL FRAME-BRACE BASED ON RANDOM CAPABILITY SPECTRUM

TECHNICAL FIELD

The disclosure relates to the technical field of structural reinforcement design methods, and more particularly to an integral reinforcement design method for an external frame-brace based on a random capability spectrum.

BACKGROUND

An integral reinforcement of an external sub structure uses a cooperative work between the external sub structure and an original structure to change a structural system of the original structure, and transfer a damage from the original structure to the external sub structure, so as to change a stress state and a deformation mode of the original structure, enhance an overall seismic resistance of the original structure, and slow down an overall seismic demand, and the integral reinforcement of the external sub structure is a reinforcement method of the structural system.

"Technical specification for seismic strengthening of buildings" of China clearly states that "in order to prevent local reinforcement from increasing irregularity of the structure, we should capability improve the seismic capability of structures via the integral reinforcement approach". However, in an operational level, the reinforcement method specified in the above specification improves the seismic capability through improving a bearing capability of components (e.g., increasing section, wrapping steel, etc.), but an integral reinforcement design method of an external sub structure is lacking. In addition, an existing integral reinforcement design method of the external sub structure is mainly based on a lateral force resistance method, and is a traditional deterministic design method that does not consider uncertain factors such as structural dimensions and loads, as well as structural performance indicators such as displacement and structural capability.

SUMMARY

A purpose of the disclosure is as follows.

The disclosure aims to provide an integral reinforcement design method of an external frame-brace based on a random capability spectrum method, which conforms to actual working conditions and random characteristics of the structure and highlights requirements of structural performance level.

Technical solutions of the disclosure are as follows.

The integral reinforcement design method for the external frame-brace based on the random capability spectrum method of the disclosure includes:
(1) evaluating an original structure before reinforcement by using the random capability spectrum method;
(2) performing a reinforcement analysis on an external frame-brace sub structure by using the random capability spectrum method to obtain a reinforced structure; and
(3) performing a reinforcement verification on the reinforced structure by using the random capability spectrum method; where the step (3) includes:
(3.1) counting distribution characteristics of uncertain parameters, and performing a random sampling on the distribution characteristics of the uncertain parameters to generate random model parameter values of the reinforced structure;
(3.2) performing a pseudo static analysis on the reinforced structure to obtain a lateral force-displacement curve of the reinforced structure, and converting the lateral force-displacement curve of the reinforced structure to a capability spectrum acceleration-capability spectrum displacement curve of the reinforced structure;
(3.3) obtaining, according to a structural seismic design requirement, an elastic-plastic response spectrum curve of the reinforced structure under a rare earthquake level, and converting the elastic-plastic response spectrum curve of the reinforced structure to a demand spectrum acceleration-demand spectrum displacement curve of the reinforced structure;
(3.4) obtaining random intersections between the capability spectrum acceleration-capability spectrum displacement curve of the reinforced structure and the demand spectrum acceleration-demand spectrum displacement curve of the reinforced structure, calculating statistics of the random intersections through a lognormal distribution hypothesis to generate a probability density curve $p(\cdot)$ and a cumulative distribution curve $F(\cdot)$;
(3.5) calculating a target reinforcement displacement $S_{d\text{-}tar\text{-}RE}$ of the reinforced structure under the rare earthquake level, and calculating an exceeding probability $P_f$ of the reinforced structure according to the target reinforcement displacement $S_{d\text{-}tar\text{-}RE}$ of the reinforced structure; and
(3.6) comparing the exceeding probability $P_f$ of the reinforced structure to a target exceeding probability $P_{f\text{-}tar}$; determining, in response to the exceeding probability $P_f$ of the reinforced structure being smaller than the target exceeding probability $P_{f\text{-}tar}$, the reinforced structure satisfying a preset requirement and ending design of the external frame-brace sub structure; and executing, in response to the exceeding probability $P_f$ of the reinforced structure being larger than the target exceeding probability $P_{f\text{-}tar}$, the step (2) for repetition until the reinforced structure satisfies the preset requirement.

In an embodiment, the method further includes: reinforcing the original structure by using a design scheme of the external frame-brace sub structure and connections between the original structure and the external frame-brace sub structure after ending the design of the external frame-brace sub structure.

In an embodiment, the step (1) includes:
(1.1) constructing a numerical model of the original structure before the reinforcement;
(1.2) performing a pseudo static analysis on the original structure to obtain a lateral force-displacement curve of the original structure, and converting the lateral force-displacement curve of the original structure to a capability spectrum acceleration-capability spectrum displacement curve of the original structure;
(1.3) obtaining, according to the structural seismic design requirement, an acceleration response spectrum curve the original structure under a fortification level, and converting the acceleration response spectrum curve of the original structure to a demand spectrum acceleration-demand spectrum displacement curve of the original structure; and
(1.4) obtaining an intersection between the capability spectrum acceleration-capability spectrum displacement curve of the original structure and the demand spectrum acceleration-demand spectrum displacement curve of the original structure, and comparing a displacement $S_{d\text{-}int}$ corresponding to the intersection to a target design displacement $S_{d\text{-}tar\text{-}FE}$ for reinforcing the original structure under the fortification level; determining, in response to the displacement $S_{d\text{-}int}$ corresponding to the intersection being smaller than the target design displacement $S_{d\text{-}tar\text{-}FE}$, the original structure doing not require the reinforcement; and performing, in response to the displacement $S_{d\text{-}int}$ the intersection being larger than the target design displacement $S_{d\text{-}tar\text{-}FE}$, the reinforcement on the original structure.

In an embodiment, the external frame-brace sub structure in the step (2) includes: external frame columns, external frame beams and external braces; the external frame columns and the external frame beams are connected in pairs to form external frame nodes, an end of each of the external braces is connected to a center of one of the external frame beams, another end of each of the external braces is connected to the external frame nodes, to thereby form the external frame-brace sub structure; and the external frame-brace sub structure is integrally connected to the original structure, to thereby obtain the reinforced structure.

In an embodiment, a process of the reinforcement analysis in the step (2) includes:
(2.1) calculating a difference between equivalent stiffness of the original structure and equivalent stiffness of the reinforced structure, and distributing particle stiffness to each floor of the original structure by using a series model;
(2.2) calculating modified lateral stiffness of the external frame columns and modified lateral stiffness of the external braces, and obtaining an initial reinforcement dimension and layout scheme of the external frame-brace sub structure; and
(2.3) calculating a shear demand of the external frame columns and an axial force demand of the external braces, and designing the external frame columns, the external frame nodes and the external braces, as well as connections between components of the external frame-brace sub structure, and connections between the original structure and the external frame-brace sub structure.

In an embodiment, the step (2.1) includes:
calculating the equivalent stiffness $K_{ini}$ of the original structure before the reinforcement according to a first basic period $T_{ini}$ of the original structure before the reinforcement; where formulas for calculating the equivalent stiffness $K_{ini}$ of the original structure are expressed as follows:

$$K_{ini} = \frac{4\pi^2 M_e}{T_{ini}^2}, M_e = \alpha \cdot \sum_{i=1}^{N} m_i, i = 1, 2, \ldots, N$$

where $M_e$ represents an equivalent mass of the original structure;
calculating, according to a target period $T_{tar}$ for reinforcing the original structure under the fortification level, the equivalent stiffness $K_{tar}$ of the reinforced structure by introducing a mass amplification coefficient $\tau$; where a formula for calculating the equivalent stiffness $K_{tar}$ of the reinforced structure is expressed as follows:

$$K_{tar} = \frac{4\pi^2 M_e \cdot \tau}{T_{tar}^2};$$

calculating a difference $K_{sum}$ between $K_{ini}$ and $K_{tar}$, and distributing the particle stiffness to each floor of the original structure by using the series model; where a formula for calculating the difference $K_{sum}$ is expressed as follows:

$$K_{sum} = K_{tar} - K_{ini} = \left( \sum_{i=1}^{N} \gamma_i \cdot \frac{1}{K_{F-i}} \right)^{-1};$$

where $K_{F-i}$ represents particle stiffness of the i-th floor in the series model, and $\gamma_i$ represents a stiffness distribution coefficient of the i-th floor.

In an embodiment, in the step (2.2), the modified lateral stiffness $K_c$ of the external frame columns and the modified lateral stiffness $K_b$ of the external braces are calculated through the following formulas:

$$K_b = \eta \cdot (1 - \lambda_b) \cdot \sin\theta_b \cos^2\theta_b \cdot \frac{E_b A_b}{h}, K_c = \frac{12 E_c I_c}{h^3} \cdot \lambda_c;$$

where $\lambda_b$ represents an axial deformation coefficient of the external frame columns; $\lambda_c$ represents a bending deformation coefficient of the external frame beams; $\theta_b$ represents an angle between each of the external braces and a horizontal line, $\eta$ represents a stiffness reduction coefficient of the external brace, $E_b$ represents an elastic modulus of the external braces, $A_b$ represents a cross-section area of the external braces, $E_c$ represents an elastic modulus of the external frame columns, $I_c$ represents a moment of inertia of the external frame columns, and h represents a height of a floor of the original structure.

In an embodiment, the uncertain parameters in the step (3.1) include: a material, a load and a dimension, and the distribution characteristics comprise: a distribution type, a mean value and a standard deviation.

In an embodiment, the statistics in the step (3.4) include: a logarithmic mean value and a logarithmic standard deviation.

Compared to the related art, the disclosure has the following significant advantages. 1. Compared to a traditional deterministic reinforcement design method, the disclosure considers a design method of uncertain factors such as structural parameters and load parameters, and is more in line with the actual working conditions and the random characteristics of the structure. 2. Compared to a traditional reinforcement design method based on a lateral force, the disclosure considers performance indicators such as displacement and capability of the structure, and is a seismic reinforcement design method based on structural performance. 3. The disclosure fully considers modules of evaluation, analysis and verification of the reinforcement design method, and the modules are progressive layer by layer, so that the reinforcement design effect is improved.

DETAILED DESCRIPTION OF EMBODIMENTS

Technical solutions of the disclosure are further described in conjunction with drawings below.

Figure 1A:
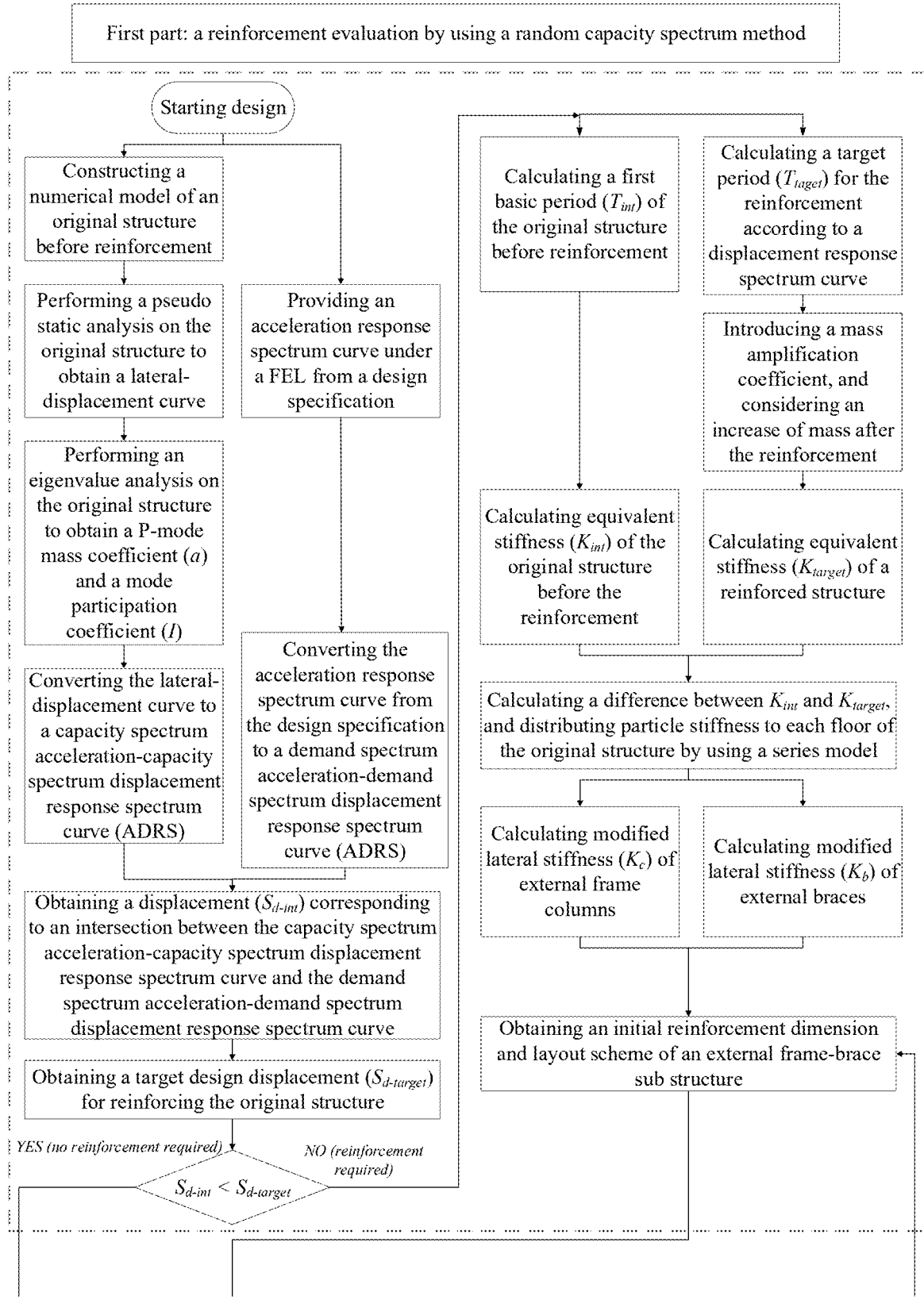
FIG. 1A and FIG. 1B illustrate a flowchart of an integral reinforcement design method for an external frame-brace based on a random capability spectrum according to an embodiment of the disclosure.
Figure 1B:
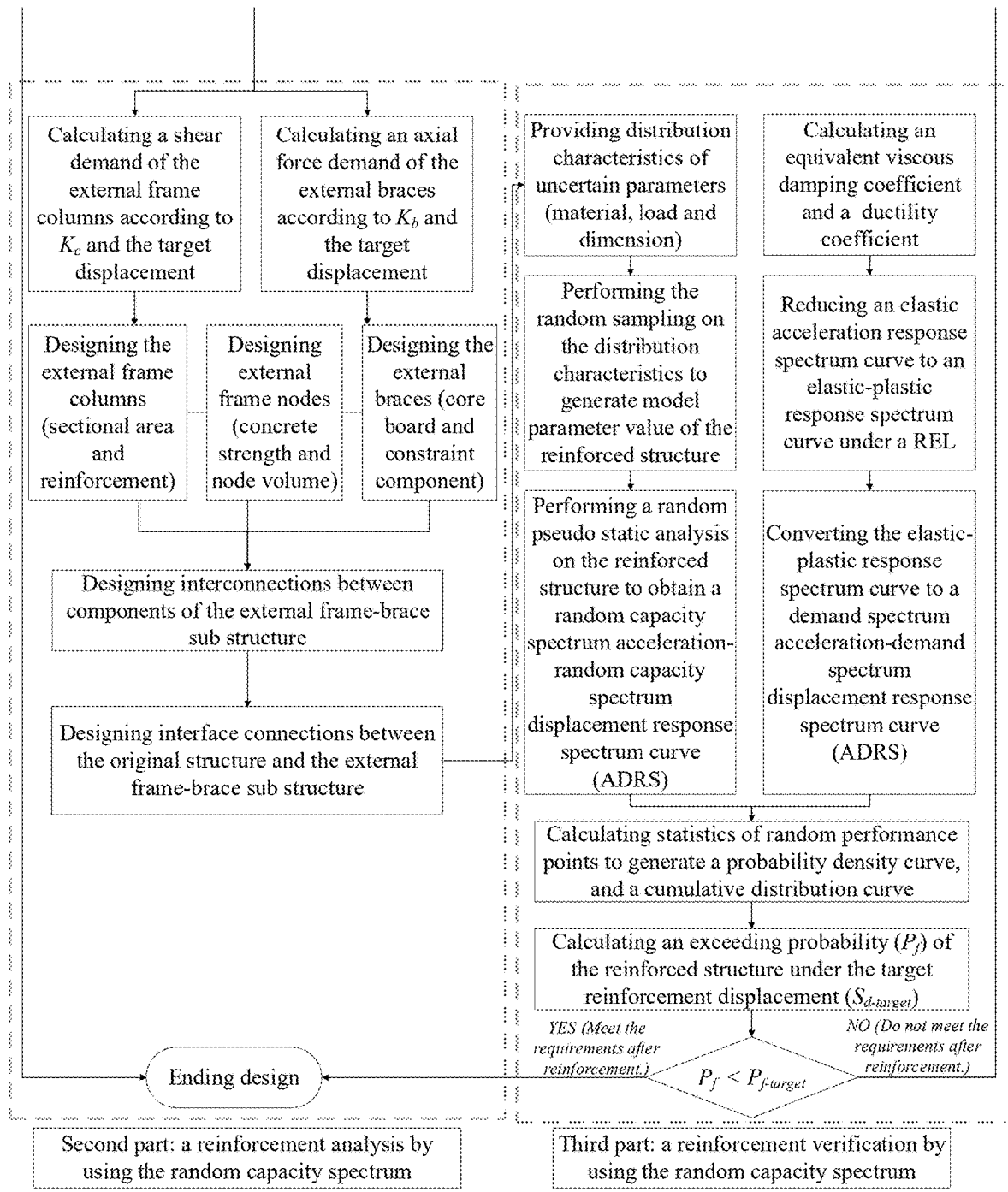

As shown in FIG. 1A and FIG. 1B, and FIG. 1A is continued in FIG. 1B, an integral reinforcement design method for an external frame-brace based on a random capability spectrum of the disclosure includes: an evaluation before reinforcement module (i.e., a first module), a reinforcement analysis module (i.e., a second module) and a reinforced verification module (i.e., a third module), and the modules are progressive layer by layer. The first module performs the evaluation before the reinforcement based on a random capability spectrum method, when an evaluation result is that reinforcement is needed, the second module is executed, that is, the reinforcement analysis is performed based on the random capability spectrum method; when the evaluation result is that the reinforcement is not needed, design of an external frame-brace sub structure is not needed and the reinforcement process is ended. The third module is executed after the second module ends, that is, the reinforced verification is performed based on the random capability spectrum method. When a verification result is not passed, the second module is executed and the reinforcement analysis is reperformed; when the verification result is pass, the reinforcement process is ended.

A specific process of the reinforcement design method includes the following steps (1)-(3).

In step (1), an original structure is evaluated before reinforcement by using the random capability spectrum method. The step (1) specifically includes the following steps (1.1)-(1.4).

In step (1.1), a numerical model of the original structure before reinforcement is constructed.

In step (1.2), a lateral load is applied on the original structure, and a pseudo static analysis is performed on the original structure to obtain a lateral force $V_b$-displacement $u_r$ curve of the original structure; the lateral force $V_b$-displacement $u_r$ curve of the original structure is converted to a capability spectrum acceleration-capability spectrum displacement (C-ADRS) curve of the original structure; and the C-ADRS curve of the original structure is represented by the capability spectrum acceleration $S_{a-cap}$ and the capability spectrum displacement $S_{d-cap}$ as follows:

$$S_{a-cap} = \frac{V_b}{\alpha \cdot G} = \frac{V_b}{\alpha \cdot \sum_{i=1}^{N} m_i g}, S_{d-cap} = \frac{u_r}{\Gamma \cdot \phi_r};$$

$$\alpha = \frac{\left(\sum_{i=1}^{N} m_i \phi_i\right)^2}{\left(\sum_{i=1}^{N} m_i\right) \cdot \left(\sum_{i=1}^{N} m_i \phi_i^2\right)}, \Gamma = \frac{\sum_{i=1}^{N} m_i \phi_i}{\sum_{i=1}^{N} m_i \phi_i^2};$$

where $\phi_r$ represents a top floor displacement of the original structure under a first mode; $m_i$ represents a structural mass of an i-th floor of the original structure under the first mode, $\phi_i$ represents a structural displacement of the i-th floor of the original structure under the first mode, and N represents a number of floors in the original structure.

In step (1.3), an acceleration response spectrum curve of the original structure under a fortification earthquake level (FEL) is obtained according to a structural seismic design requirement. Specifically, the acceleration response spectrum curve of the original structure is represented by a demand spectrum acceleration $S_{a-dem}$ and a natural vibration period T of the original structure. The acceleration response spectrum curve of the original structure is converted to a demand spectrum acceleration-demand spectrum displacement (D-ADRS) curve of the original structure; and the D-ADRS curve of the original structure is represented by the demand spectrum acceleration $S_{a-dem}$ and the demand spectrum displacement $S_{d-dem}$ as follows:

$$S_{d-dem} = \frac{T^2}{4\pi^2} \cdot S_{a-dem}.$$

In step (1.4), an intersection between the C-ADRS curve of the original structure and the D-ADRS curve of the original structure is obtained, and a displacement $S_{d-int}$ corresponding to the intersection is compared to a target design displacement $S_{d\text{-}tar\text{-}FE}$ for reinforcing the original structure under the fortification level. In response to the displacement $S_{d\text{-}int}$ corresponding to the intersection being smaller than the target design displacement $S_{d\text{-}tar\text{-}FE}$, the original structure does not require the reinforcement; and in response to the displacement $S_{d\text{-}int}$ corresponding to the intersection being larger than the target design displacement $S_{d\text{-}tar\text{-}FE}$, the reinforcement is performed on the original structure. Specifically, a formula of the target design displacement $S_{d\text{-}tar\text{-}FE}$ is expressed as follows:

$$S_{d-tar-FE} = \frac{\sum_{i=1}^{N} \theta_{t-FE} h_i}{\Gamma \cdot \phi_r};$$

where $\theta_{t\text{-}FE}$ represents a maximum inter-story displacement angle limit of a single degree of freedom system under the fortification level; and $h_i$ represents a height of the i-th floor of the original structure.

In step (2), the reinforcement analysis is performed on an external frame-brace sub structure by using the random capability spectrum method to obtain a reinforced structure. Specifically, the external frame-brace sub structure includes: external frame columns, external frame beams and external braces. The external frame columns and the external frame beams are connected in pairs to form external frame nodes. An end of each external brace is connected to a center of one of the external frame beams, and another end of the external brace is connected to the external frame nodes, to thereby form the external frame-brace sub structure. The external frame-brace sub structure is connected to the original structure, to thereby obtain the reinforced structure. The reinforcement analysis specifically includes the following steps (2.1)-(2.3).

In step (2.1), a difference between equivalent stiffness of the original structure and equivalent stiffness of the reinforced structure is calculated, and particle stiffness is distributed to each floor of the original structure by using a series model.

Firstly, the equivalent stiffness $K_{ini}$ of the original structure before the reinforcement is calculated according to a first basic period $T_{ini}$ of the original structure before the reinforcement, and formulas for calculating the equivalent stiffness $K_{ini}$ of the original structure are expressed as follows:

$$K_{ini} = \frac{4\pi^2 M_e}{T_{ini}^2}, M_e = \alpha \cdot \sum_{i=1}^{N} m_i, i = 1, 2, \ldots, N;$$

where $M_e$ represents an equivalent mass of the original structure; and a target period $T_{tar}$ for reinforcing the original structure under the fortification level is calculated according to a relationship between the demand spectrum displacement $S_{d\text{-}dem}$ and the natural vibration period T of the original structure.

Secondly, the equivalent stiffness $K_{tar}$ of the reinforced structure, according to the target period $T_{tar}$ for reinforcing the original structure under the fortification level, is calculated by introducing a mass amplification coefficient $\tau$, and a formula for calculating the equivalent stiffness $K_{tar}$ of the reinforced structure is expressed as follows:

$$K_{tar} = \frac{4\pi^2 M_e \cdot \tau}{T_{tar}^2}.$$

Finally, a difference $K_{sum}$ between $K_{ini}$ and $K_{tar}$ is calculated, and the particle stiffness is distributed to each floor of the original structure by using the series model; and a formula for calculating the difference $K_{sum}$ is expressed as follows:

$$K_{sum} = K_{tar} - K_{ini} = \left(\sum_{i=1}^{N} \gamma_i \cdot \frac{1}{K_{F-i}}\right)^{-1};$$

where $K_{F\text{-}i}$ represents particle stiffness of the i-th floor in the series model, and $\gamma_i$ represents a stiffness distribution coefficient of the i-th floor in the series model.

In step (2.2), modified lateral stiffness of the external frame columns and modified lateral stiffness of the external braces are calculated, and an initial reinforcement dimension and layout scheme of the external frame-brace sub structure is obtained.

Formulas for calculating the modified lateral stiffness $K_c$ of the external frame columns and modified lateral stiffness $K_b$ of the external braces are expressed as follows:

$$K_b = \eta \cdot (1 - \lambda_b) \cdot \sin\theta_b \cos^2\theta_b \cdot \frac{E_b A_b}{h}, K_c = \frac{12 E_c I_c}{h^3} \cdot \lambda_c;$$

where $\lambda_b$ represents an axial deformation coefficient of the external frame columns; $\lambda_c$ represents a bending deformation coefficient of the external frame beams; $\theta_b$ represents an angle between each external brace and a horizontal line, $\eta$ represents a stiffness reduction coefficient of the external braces, $E_b$ represents an elastic modulus of the external braces, $A_b$ represents a cross-section area of the external braces, $E_c$ represents an elastic modulus of the external frame columns, $I_c$ represents a moment of inertia of the external frame columns, and h represents a height of the floor of the original structure.

A formula of the initial reinforcement dimension and layout scheme of the external frame-brace sub structure is expressed as follows:

$$K_{F-i} = \sum_{m=1}^{n_{ci}} K_{c-m}^i + \sum_{m=1}^{n_{bi}} K_{b-m}^i, i = 1, 2, \ldots, N;$$

where $K_{c\text{-}m}^i$ represents lateral stiffness of a m-th external frame column in the i-th floor, $K_{b\text{-}m}^i$ represents lateral stiffness of a m-th external brace in the i-th floor, $n_{ci}$ represents a number of initial reinforced external frame columns in the i-th floor, and $n_{bi}$ represents a number of initial reinforced external braces in the i-th floor.

In step (2.3), a shear demand of the external frame columns is calculated according to $K_c$ and a target displacement, and an axial force demand of the external braces is calculated according to $K_b$ and the target displacement. Based on the shear demand of the external frame columns and the axial force demand of the external braces, a section area and a reinforcement of the external frame columns are designed, a concrete strength and a node volume of the external frame nodes are designed, a core board and a constraint component of the external braces are designed, and connections between components of the external frame-brace sub structure and connections between the original structure and the external frame-brace sub structure are designed.

In step (3), the reinforcement verification is performed on the reinforced structure by using the random capability spectrum. The step (3) specifically includes the following steps (3.1)-(3.6).

In step (3.1), distribution characteristics of uncertain parameters are counted. The uncertain parameters include: a material, a load and a dimension, and the distribution characteristics include: a distribution type, a mean value and a standard deviation. A random sampling is performed on the distribution characteristics of the uncertain parameters to generate random model parameter values of the reinforced structure.

In step (3.2), a lateral load is applied on the reinforced structure, a pseudo static analysis is performed on the reinforced structure to obtain a lateral force-displacement curve of the reinforced structure, and the lateral force-displacement curve of the reinforced structure is converted to a capability spectrum acceleration-capability spectrum displacement curve of the reinforced structure.

In step (3.3), an acceleration response spectrum curve of the reinforced structure under a rare earthquake level (REL) is obtained according to the structural seismic design requirement, the acceleration response spectrum curve of the reinforced structure is reduced to an elastic-plastic response spectrum curve of the reinforced structure according to an equivalent viscous damping coefficient, and the elastic-plastic response spectrum curve of the reinforced structure is converted to a demand spectrum acceleration-demand spectrum displacement curve of the reinforced structure. A formula of the equivalent viscous damping coefficient $\zeta_{eq}$ and a ductility coefficient $\mu$ of the reinforced structure are expressed as follows:

$$\zeta_{eq} = \frac{E_D}{4\pi E_s} = \frac{2}{\pi} \cdot \frac{(\mu-1)(1-r)}{\mu(1+r\mu-r)};$$

where $E_D$ represents an elastic-plastic hysteresis energy, $E_s$ represents a maximum strain energy, and r represents a tangent stiffness coefficient.

In step (3.4), random intersections between the capability spectrum acceleration-capability spectrum displacement curve of the reinforced structure and the demand spectrum acceleration-demand spectrum displacement curve of the reinforced structure are obtained, a lognormal distribution hypothesis is introduced to calculate statistics of the random intersections, to thereby generate a probability density curve p(·) and a cumulative distribution curve F(·). Specifically, the statistics of the random intersections include: a logarithmic mean value and a logarithmic standard deviation.

In step (3.5), a target reinforcement displacement $S_{d\text{-}tar\text{-}RE}$ of the reinforced structure under the rare earthquake level is calculated, and a corresponding exceeding probability $P_f$ of the reinforced structure is calculated according to the target reinforcement displacement $S_{d\text{-}tar\text{-}RE}$ of the reinforced structure. A formula for calculating the exceeding probability $P_f$ is expressed as follows:

$$P_f = 1 - F(S_d < S_{d\text{-}tar\text{-}RE}) = 1 - \int_{-\infty}^{S_{d\text{-}tar\text{-}RE}} p(S_d) \cdot dS_d;$$

where $\theta_{r\text{-}RE}$ adopts the maximum inter-story displacement angle limit of the single degree of freedom system under the rare earthquake level.

In step (3.6), the exceeding probability $P_f$ of the reinforced structure is compared to a target exceeding probability $P_{f\text{-}tar}$, in response to the exceeding probability $P_f$ of the reinforced structure being smaller than the target exceeding probability $P_{f\text{-}tar}$, the reinforced structure satisfies a preset requirement, and the design of the external frame-brace sub structure is ended; and in response to the exceeding probability $P_f$ of the reinforced structure being larger than the target exceeding probability $P_{f\text{-}tar}$, the step (2) is executed for repetition until the reinforced structure satisfies the preset requirement.

Figure 2:
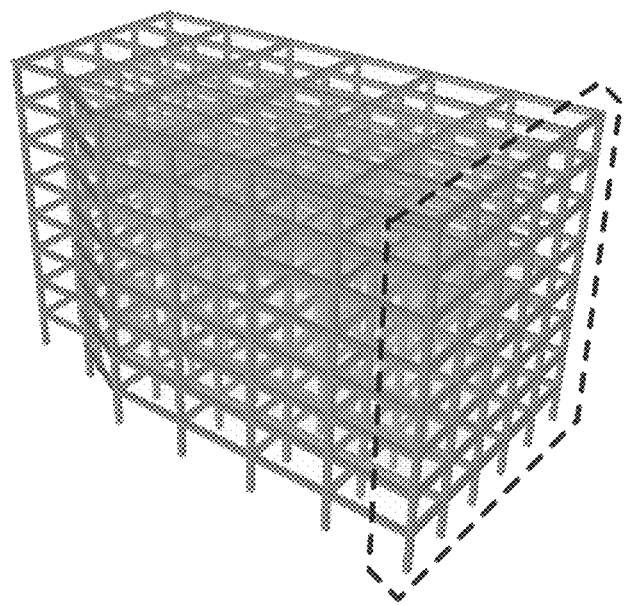
FIG. 2 illustrates a schematic structural diagram of an original structure according to an embodiment of the disclosure.

In order to verify the reinforcement design method of the disclosure, the reinforcement design is performed on an original structure of a 5-span 8-story frame structure shown in FIG. 2. The site where the original structure is located is 8-degree fortification, a corresponding peak acceleration is 0.2 gravitational accelerations (g), a theoretical span of the original structure is 5500 meters (m), a height of a bottom floor is 5000 m, and a height of each of other floors is 4000 m. A model is established based on an OpenSEEs finite element software platform. In the analysis, the target exceeding probability $P_{f\text{-}tar}$ is 5%, and the value is obtained based on a 95% performance guaranteeing rate in a reliability theory.

A pseudo static analysis and an eigenvalue analysis of the first module are performed on the original structure before reinforcement, and the lateral force-displacement curve and a target acceleration response spectrum curve are converted to acceleration-displacement response spectrum curves, and performance points (i.e., abovementioned intersections) are obtained.

Figure 3:
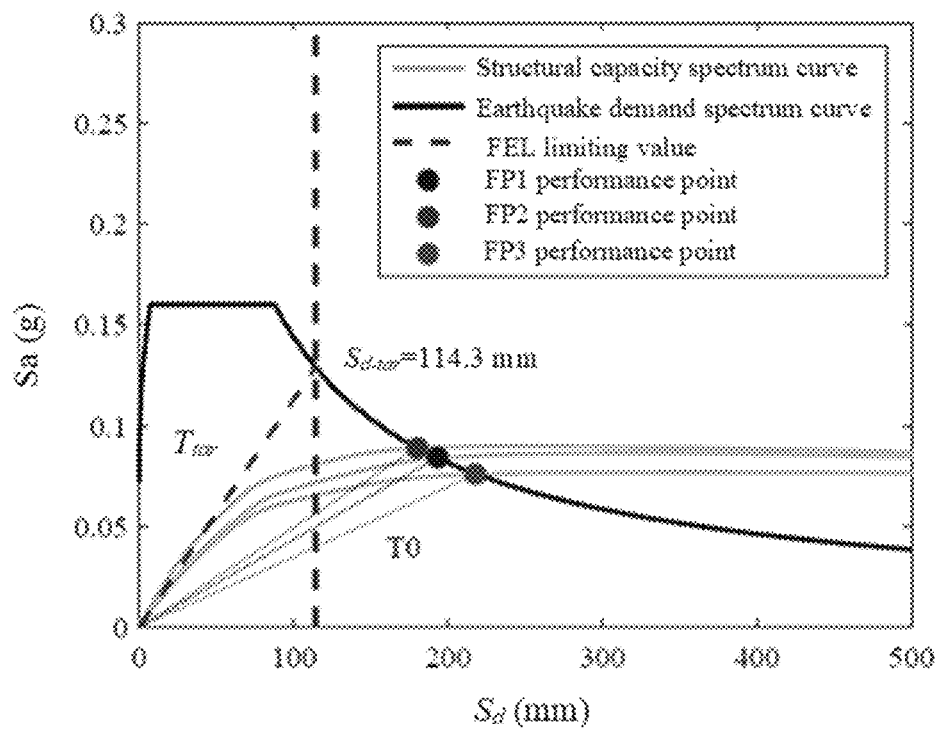
FIG. 3 illustrates a spectral acceleration-spectral displacement ($S_a$-$S_d$) analysis diagram in a first module according to an embodiment of the disclosure.
Figure 4:
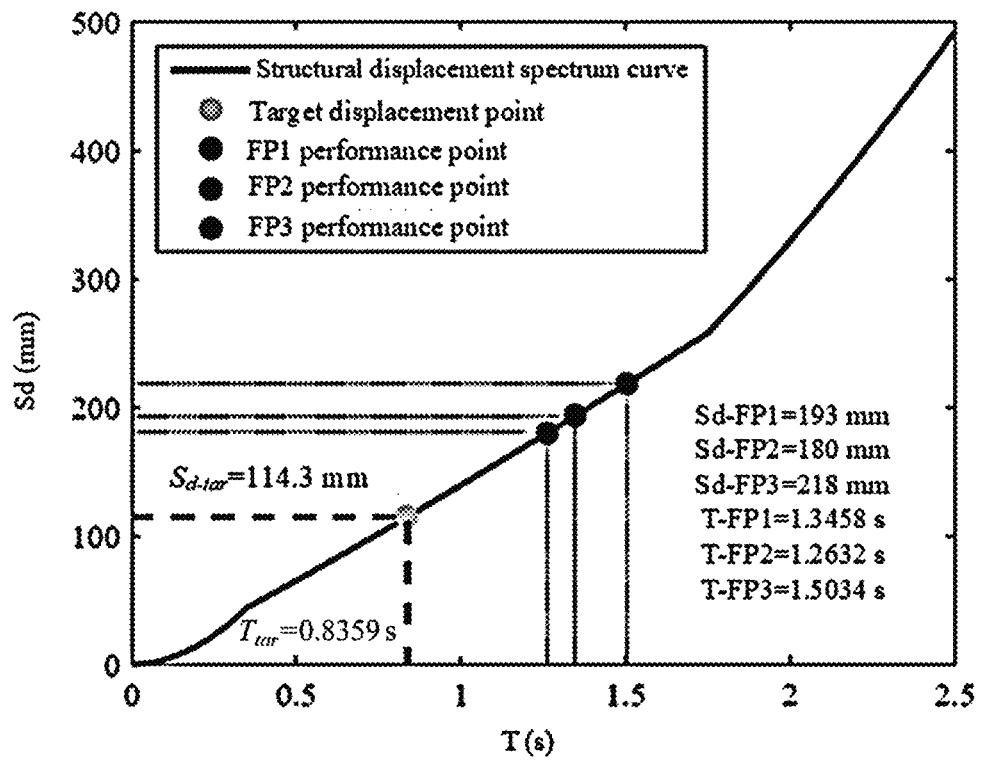
FIG. 4 illustrates a spectral displacement-time ($S_d$-T) analysis diagram in the first module according to an embodiment of the disclosure.
Figure 5:
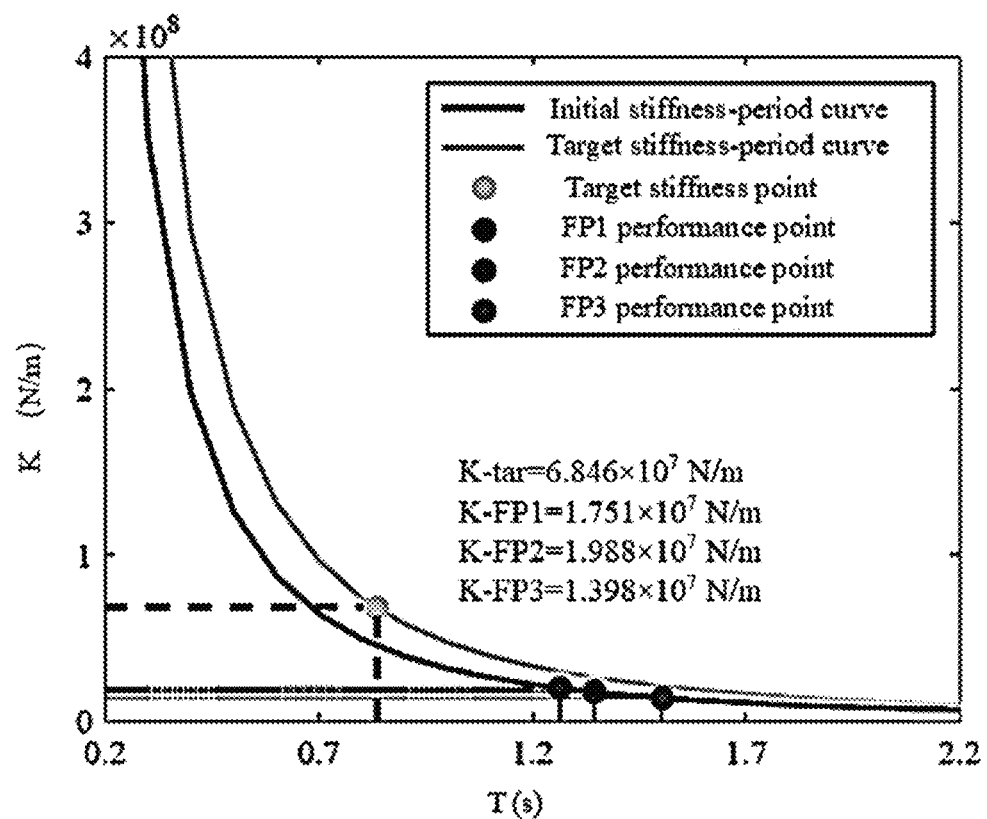
FIG. 5 illustrates a stiffness-time (K-T) analysis diagram in the first module according to an embodiment of the disclosure.

As shown in FIGS. 3-5, it can be seen that a calculation result of the target design spectrum displacement $S_{d\text{-}tar\text{-}FE}$ is 114.3 mm, results of the spectrum displacements $S_{d\text{-}int}$ of the performance points (i.e., three intersections FP1, FP2 and FP3 between the structural capability spectrum curves C-ADRS and the earthquake demand spectrum curve D-ADRS in FIG. 3) of the original structure before reinforcement are respectively 193 mm, 180 mm and 218 mm, and the spectrum displacements $S_{d\text{-}int}$ are larger than the target design spectrum displacement $S_{d\text{-}tar\text{-}FE}$, thus, the reinforcement design is needed.

Figure 6:
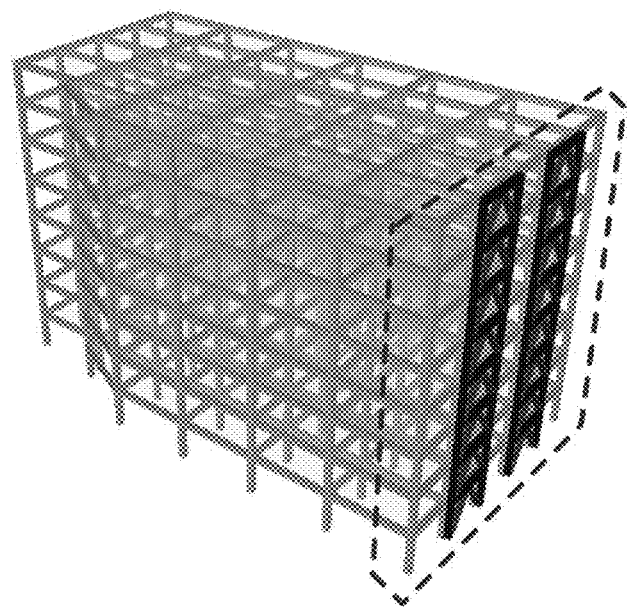
FIG. 6 illustrates a schematic structural diagram of a first reinforcement method for an external frame-brace sub structure according to an embodiment of the disclosure.
Figure 7:
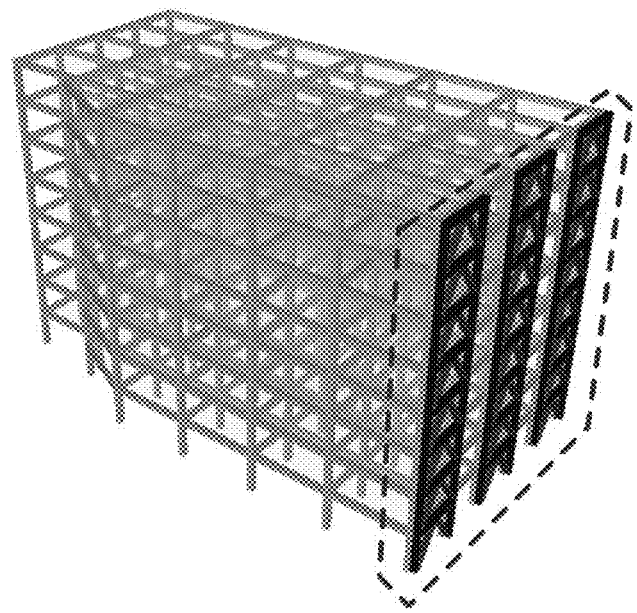
FIG. 7 illustrates a schematic structural diagram of a second reinforcement method for the external frame-brace sub structure according to an embodiment of the disclosure.
Figure 8A:
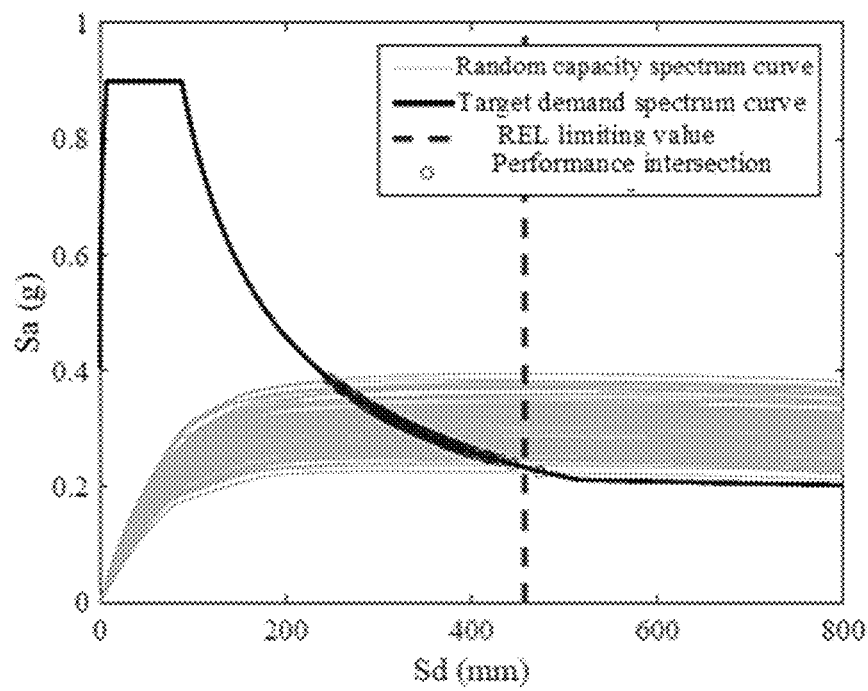
FIG. 8a illustrates a $S_a$-$S_d$ analysis diagram of a situation of the first reinforcement method and a first loading method in a third module according to an embodiment of the disclosure.
Figure 8B:
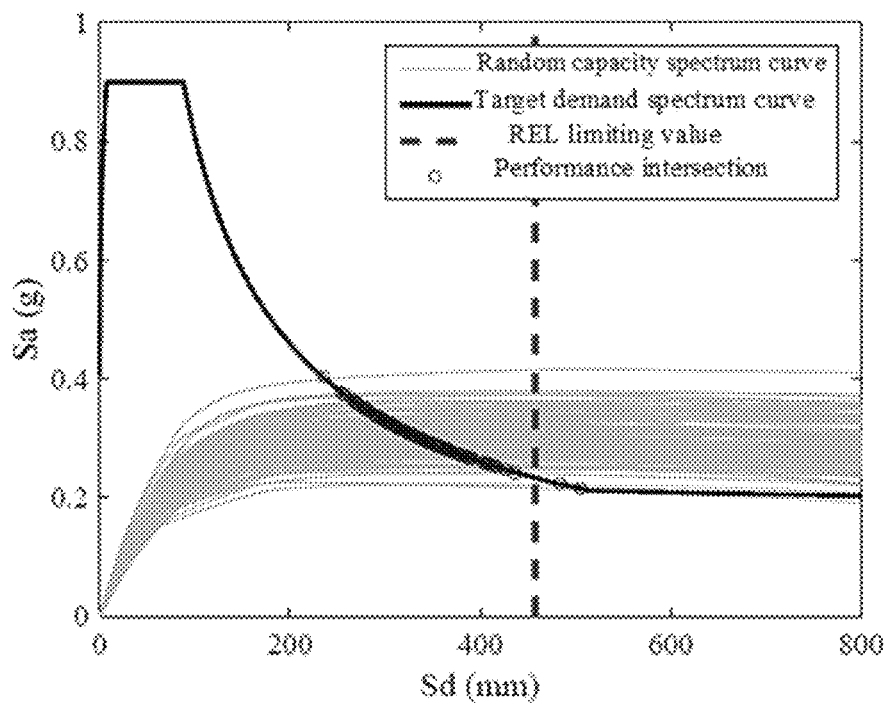
FIG. 8b illustrates a $S_a$-$S_d$ analysis diagram of a situation of the first reinforcement method and a second loading method in the third module according to an embodiment of the disclosure.
Figure 8C:
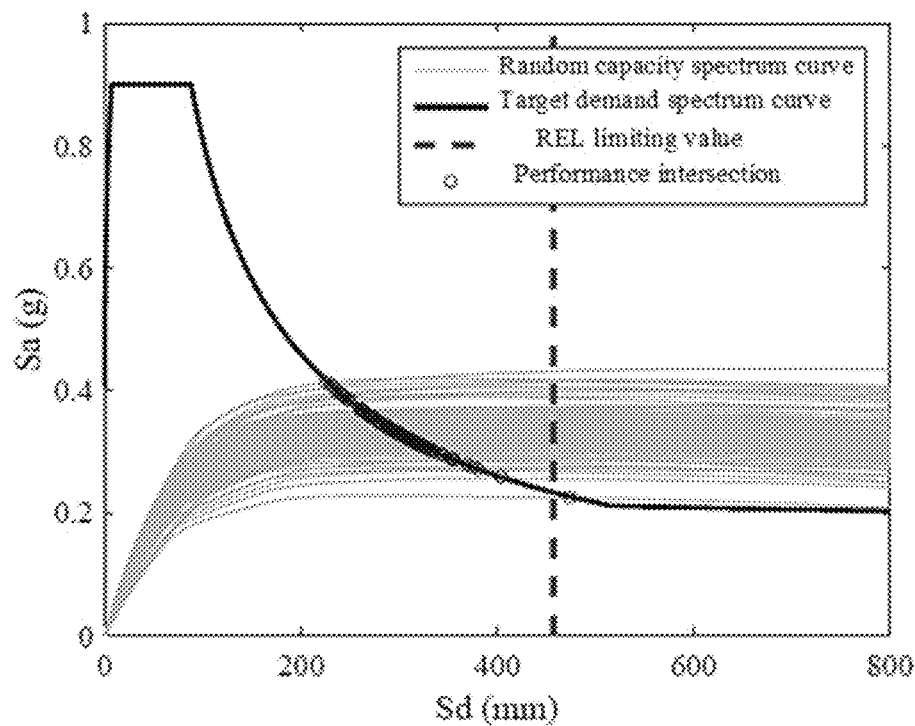
FIG. 8c illustrates a $S_a$-$S_d$ analysis diagram of a situation of the second reinforcement method and the first loading method in the third module according to an embodiment of the disclosure.
Figure 8D:
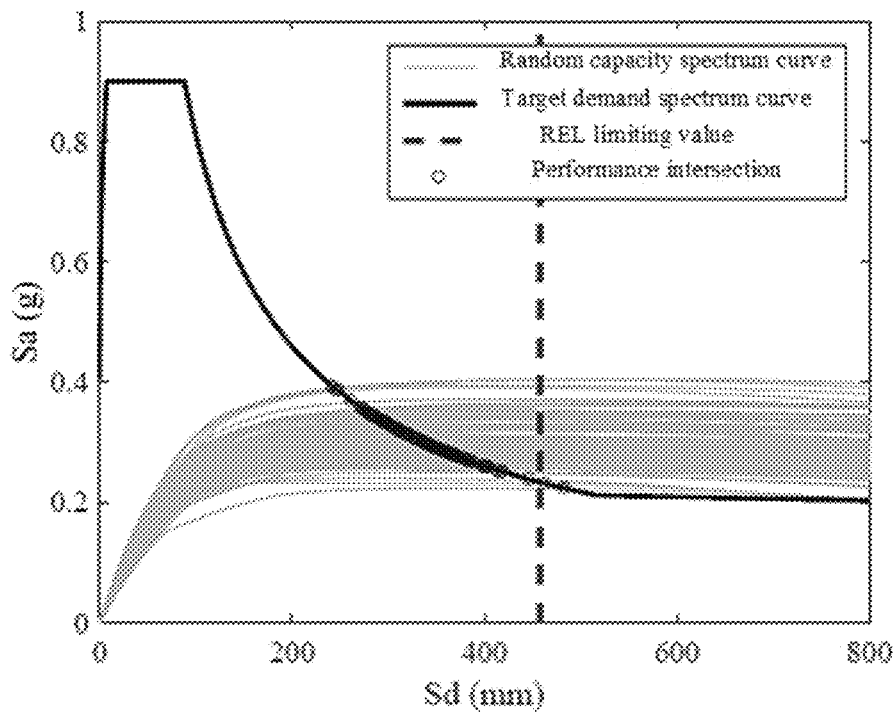
FIG. 8d illustrates a $S_a$-$S_d$ analysis diagram of a situation of the second reinforcement method and the second loading method in the third module according to an embodiment of the disclosure.
Figure 9A:
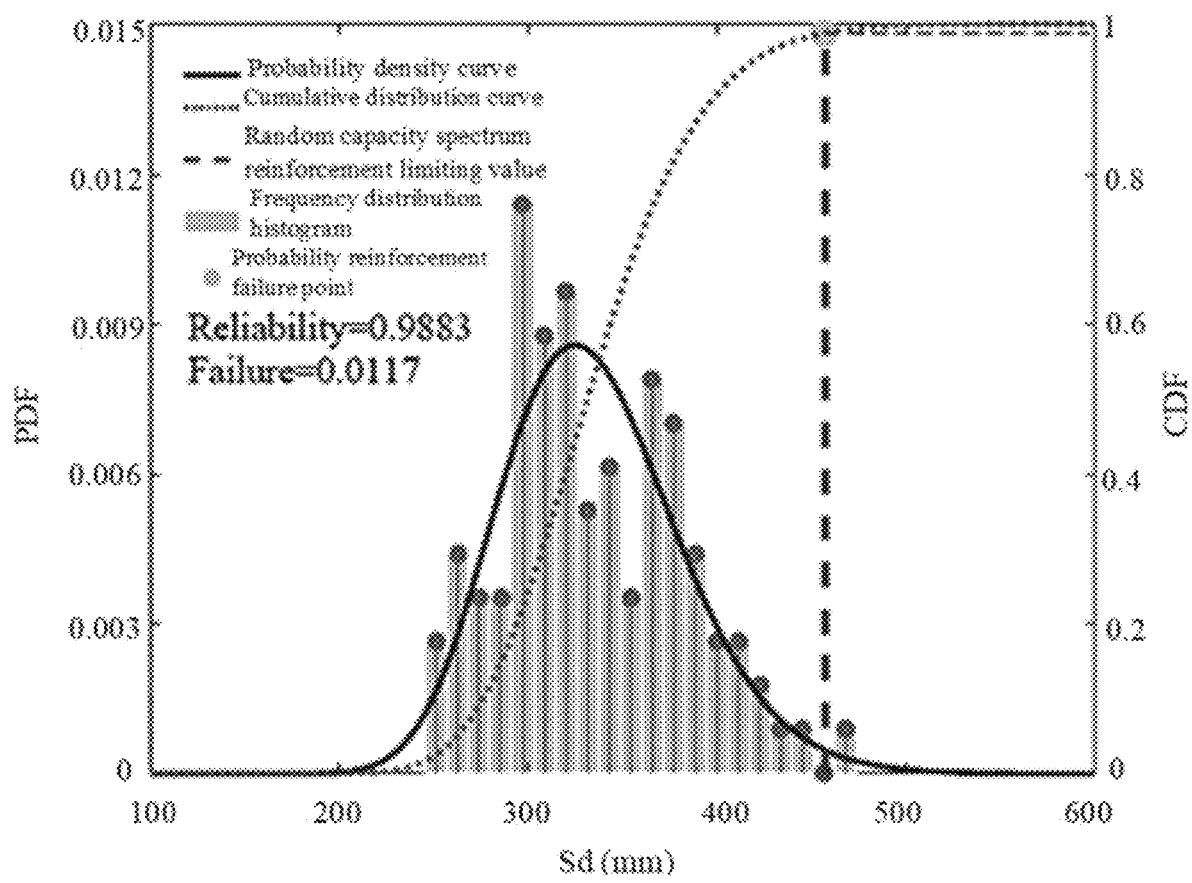
FIG. 9a illustrates a histogram, a probability density curve, and a cumulative distribution curve of the situation of the first reinforcement method and the first loading method in the third module according to an embodiment of the disclosure.
Figure 9B:
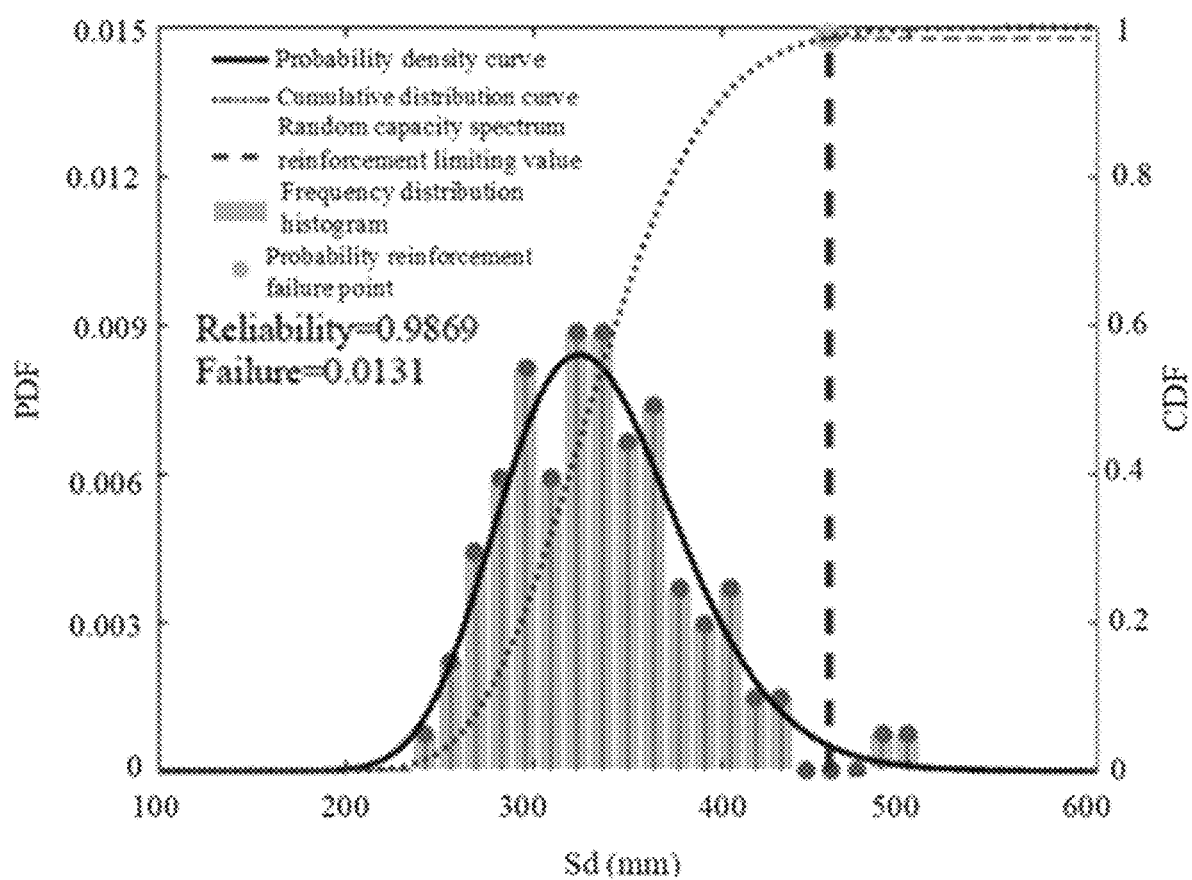
FIG. 9b illustrates a histogram, a probability density curve, and a cumulative distribution curve of the situation of the first reinforcement method and the second loading method in the third module according to an embodiment of the disclosure.
Figure 9C:
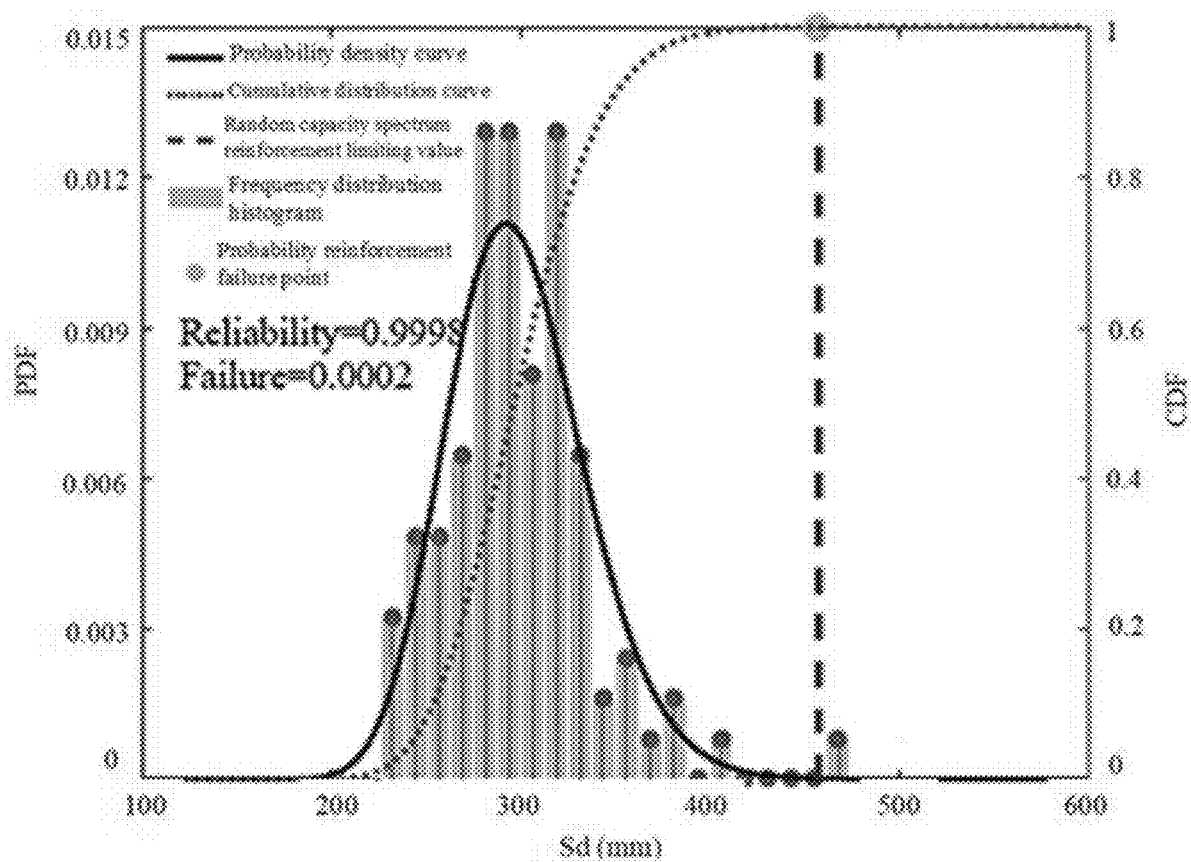
FIG. 9c illustrates a histogram, a probability density curve, and a cumulative distribution curve of the situation of the second reinforcement method and the first loading method in the third module according to an embodiment of the disclosure.
Figure 9D:
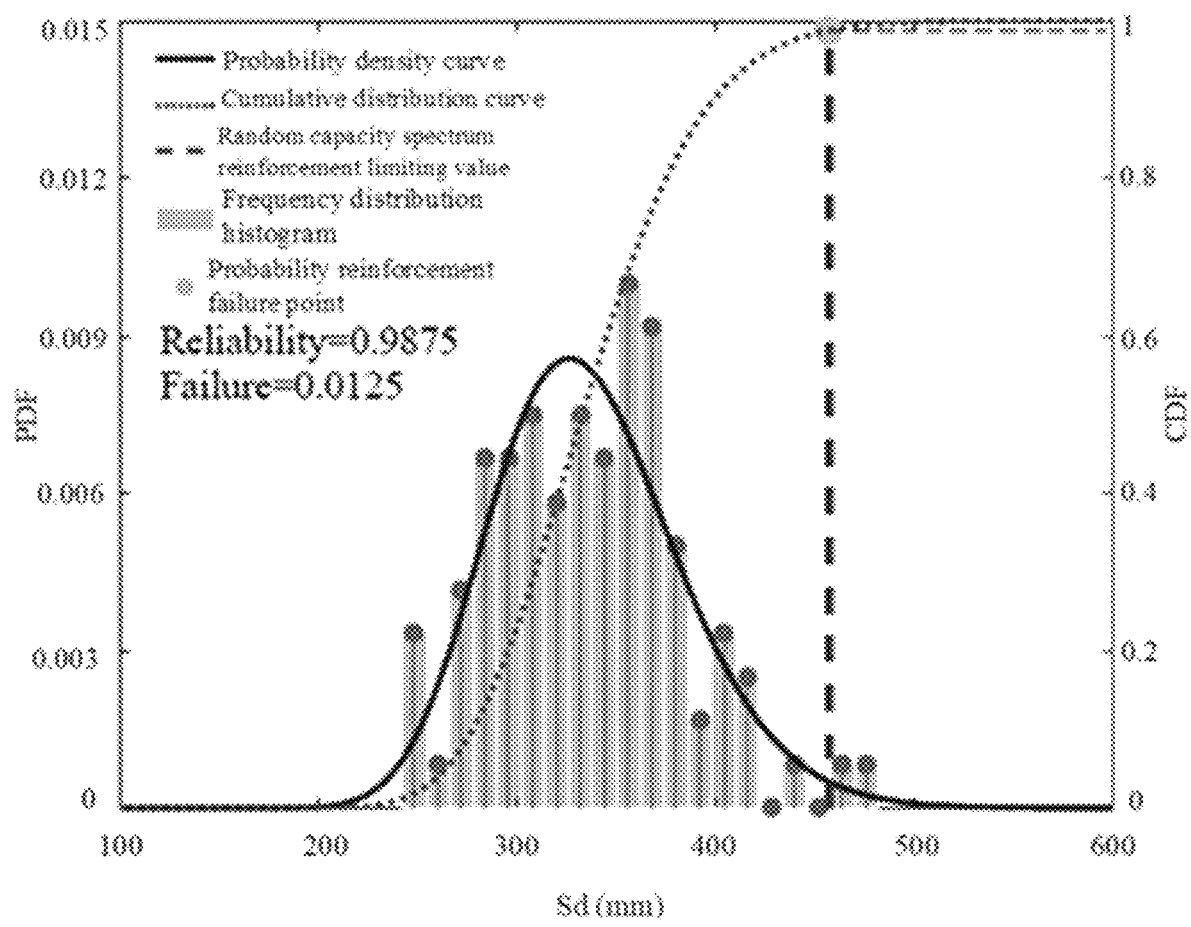
FIG. 9d illustrates a histogram, a probability density curve, and a cumulative distribution curve of the situation of the second reinforcement method and the second loading method in the third module according to an embodiment of the disclosure.

The reinforcement design analysis of the second module is performed on the original structure to obtain a reinforced structure. As shown in FIGS. 6-7, the external frame-brace sub structure is used to reinforce the original structure, and specific reinforcement methods include: a first reinforcement method and a second reinforcement method, the first reinforcement method is to reinforce the second and fourth spans, and the second reinforcement method is to reinforce the first, third and fifth spans. Two loading methods of the lateral force are used, a first loading method is an inverted triangle horizontal force loading method, and a second loading method is a uniformly distributed horizontal force loading method. A target period for reinforcing the original structure is calculated according to the displacement response spectrum, and equivalent stiffness of the original structure and equivalent stiffness of the reinforced structure are obtained. As shown in FIG. 4, for the target design displacement $S_{d\text{-}tar\text{-}FE}$, a corresponding basic period of the reinforced structure is obtained as 0.8359 seconds (s), and for the three performance points FP1, FP2 and FP3, corresponding reinforcement demand periods are respectively 1.3458 s, 1.2632 s and 1.5034 s. As shown in FIG. 5, for the target design displacement $S_{d\text{-}tar\text{-}FE}$, a corresponding target stiffness is obtained as 6.846×10$^7$ newtons per meter (N/m), and for the three performance points FP1, FP2 and FP3, corresponding reinforcement basic stiffness are respectively 1.751×10$^7$ N/m, 1.988×10$^7$ N/m and 1.398×10$^7$ N/m. The corresponding reinforcement basic stiffness of the three performance points are distributed to each floor of the original structure by using the series model, and the initial reinforcement dimension and layout scheme of the external frame-brace sub structure is obtained. The reinforcement analysis is performed on the original structure based on the random capability spectrum method, and the reinforcement analysis includes performing a calculation analysis of the external frame-brace sub structure for reinforcing, calculating internal force demands of the external frame columns and the external braces according to theoretical lateral stiffness and the target displacement, calculating specific dimensions of the external frame columns, the external frame nodes and the external braces, calculating interconnections between components of the external frame-brace sub structure, and calculating an interface connection between the original structure and the external frame-brace sub structure.

The reinforcement verification of the third module is performed on the reinforced structure by using the random capability spectrum method, and the reinforcement verification includes calculating the distribution characteristics of the uncertain parameters and performing the random sampling on the distribution characteristics of the uncertain parameters, performing a random pseudo static analysis on the reinforced structure to obtain a random capability spectrum acceleration-capability spectrum displacement curve of the reinforced structure, calculating an equivalent viscous damping coefficient and a ductility coefficient of the reinforced structure, reducing an elastic acceleration response spectrum curve of the reinforced structure to an elastic-plastic response spectrum curve of the reinforced structure, converting the elastic-plastic response spectrum curve of the reinforced structure to a demand spectrum acceleration-demand spectrum displacement curve of the reinforced structure, calculating statistics of the random performance points (i.e., the intersections) to generate a corresponding histogram, a probability density curve, and a cumulative distribution curve, as shown in FIGS. 8a-9d, calculating an exceeding probability of the reinforced structure under the target reinforcement displacement, and comparing the exceeding probability of the reinforced structure to a set target exceeding probability.

As shown in FIGS. 9a-9d, a reliability and the exceeding probability $P_f$ of the reinforced structure obtained by using the reinforcement design method based on the random capability spectrum method of the disclosure are respectively shown in Table 1. Based on the above content, the target exceeding probability $P_{f-tar}$ of the reinforced structure is 5%, and the exceeding probabilities $P_f$ are smaller than the target exceeding probability $P_{f-tar}$. The step indicates that the first reinforcement method and the second reinforcement method have reliable guaranteeing rate after considering randomness of the structure and probability capability distribution, and verifications of the first loading method and the second loading method are obtained. The reinforced structure satisfies the requirement, and the design is ended.

TABLE 1 calculation results of the reliability and the exceeding probability of the reinforced structure under different reinforcement conditions

| Reinforcement condition | Reliability of reinforced structure | Exceeding probability $P_f$ of reinforced structure | Target exceeding probability $P_{f-tar}$ |
|---|---|---|---|
| First reinforcement method and first loading method | 0.9883 | 0.0117 | 0.05 |
| First reinforcement method and second loading method | 0.9869 | 0.0131 | |
| Second reinforcement method and first loading method | 0.9998 | 0.0002 | |
| Second reinforcement method and second loading method | 0.9875 | 0.0125 | |

What is claimed is:

1. An integral reinforcement design method for an external frame-brace based on a random capability spectrum, comprising:

(1) evaluating an original structure before reinforcement;
(2) performing a reinforcement analysis on an external frame-brace sub structure to obtain a reinforced structure;
   wherein the external frame-brace sub structure in the step (2) comprises: external frame columns, external frame beams and external braces; the external frame columns and the external frame beams are connected in pairs to form external frame nodes, an end of each of the external braces is connected to a center of one of the external frame beams, another end of each of the external braces is connected to one of the external frame nodes opposite to the one of the external frame beams, to thereby form the external frame-brace sub structure; and the external frame-brace sub structure is integrally connected to the original structure, to thereby obtain the reinforced structure;
   wherein a process of the reinforcement analysis in the step (2) comprises:
   (2.1) calculating a difference between equivalent stiffness of the original structure and equivalent stiffness of the reinforced structure, and distributing particle stiffness to each floor of the original structure by using a series model;
   (2.2) calculating modified lateral stiffness of the external frame columns and modified lateral stiffness of the external braces, and obtaining an initial reinforcement dimension and layout scheme of the external frame-brace sub structure; and (2.3) calculating a shear demand of the external frame columns and an axial force demand of the external braces, and designing the external frame columns, the external frame nodes, and the external braces, as well as connections between components of the external frame-brace sub structure, and connections between the original structure and the external frame-brace sub structure; and (3) performing a reinforcement verification on the reinforced structure; wherein step (3) comprises:

(3.1) counting distribution characteristics of uncertain parameters, and performing a random sampling on the distribution characteristics of the uncertain parameters to generate random model parameter values of the reinforced structure;

(3.2) performing a pseudo static analysis on the reinforced structure to obtain a lateral force-displacement curve of the reinforced structure, and converting the lateral force-displacement curve of the reinforced structure to a capability spectrum acceleration-capability spectrum displacement curve of the reinforced structure;

(3.3) obtaining, according to a structural seismic design requirement, an elastic-plastic response spectrum curve of the reinforced structure, and converting the elastic-plastic response spectrum curve of the reinforced structure to a demand spectrum acceleration-demand spectrum displacement curve of the reinforced structure;

(3.4) obtaining random intersections between the capability spectrum acceleration-capability spectrum displacement curve of the reinforced structure and the demand spectrum acceleration-demand spectrum displacement curve of the reinforced structure, calculating statistics of the random intersections through a lognormal distribution hypothesis to generate a probability density curve p(·) and a cumulative distribution curve F(·);

(3.5) calculating a target reinforcement displacement $S_{d\text{-}tar\text{-}RE}$ of the reinforced structure, and calculating an exceeding probability $P_f$ of the reinforced structure according to the target reinforcement displacement $S_{d\text{-}tar\text{-}RE}$ of the reinforced structure; and (3.6) comparing the exceeding probability $P_f$ of the reinforced structure to a target exceeding probability $P_{f\text{-}tar}$; determining, in response to the exceeding probability $P_f$ of the reinforced structure being smaller than the target exceeding probability $P_{f\text{-}tar}$, the reinforced structure satisfying a preset requirement and ending design of the external frame-brace sub structure; and executing, in response to the exceeding probability $P_f$ of the reinforced structure being larger than the target exceeding probability $P_{f\text{-}tar}$, the step (2) for repetition until the reinforced structure satisfies the preset requirement;

wherein the integral reinforcement design method further comprises: connecting the original structure with the external frame-brace sub structure to reinforce the original structure by using a design scheme of the external frame-brace sub structure and connections between the original structure and the external frame-brace sub structure after ending the design of the external frame-brace sub structure.

2. The integral reinforcement design method as claimed in claim 1, wherein the step (1) comprises:

(1.1) constructing a numerical model of the original structure before the reinforcement;

(1.2) performing a pseudo static analysis on the original structure to obtain a lateral force-displacement curve of the original structure, and converting the lateral force-displacement curve of the original structure to a capability spectrum acceleration-capability spectrum displacement curve of the original structure;

(1.3) obtaining, according to the structural seismic design requirement, an acceleration response spectrum curve of the original structure, and converting the acceleration response spectrum curve of the original structure to a demand spectrum acceleration-demand spectrum displacement curve of the original structure; and (1.4) obtaining an intersection between the capability spectrum acceleration-capability spectrum displacement curve of the original structure and the demand spectrum acceleration-demand spectrum displacement curve of the original structure, and comparing a displacement $S_{d\text{-}int}$ corresponding to the intersection to a target design displacement $S_{d\text{-}tar\text{-}FE}$ for reinforcing the original structure; determining, in response to the displacement $S_{d\text{-}int}$ corresponding to the intersection being smaller than the target design displacement $S_{d\text{-}tar\text{-}FE}$, the original structure doing not require the reinforcement; and performing, in response to the displacement $S_{d\text{-}int}$ corresponding to the intersection being larger than the target design displacement $S_{d\text{-}tar\text{-}FE}$, the reinforcement on the original structure.

3. The integral reinforcement design method as claimed in claim 1, wherein the step (2.1) comprises:

calculating the equivalent stiffness $K_{ini}$ of the original structure before the reinforcement according to a first basic period $T_{ini}$ of the original structure before the reinforcement;

calculating, according to a target period $T_{tar}$ for reinforcing the original structure, the equivalent stiffness $K_{tar}$ of the reinforced structure by introducing a mass amplification coefficient $\tau$; wherein a formula for calculating the equivalent stiffness $K_{tar}$ of the reinforced structure is expressed as follows:

$$K_{tar} = \frac{4\pi^2 M_e \cdot \tau}{T_{tar}^2};$$

calculating a difference $K_{sum}$ between $K_{ini}$ and $K_{tar}$, and distributing the particle stiffness to each floor of the original structure by using the series model; wherein a formula for calculating the difference $K_{sum}$ is expressed as follows:

$$K_{sum} = K_{tar} - K_{ini} = \left(\sum_{i=1}^{N} \gamma_i \cdot \frac{1}{K_{F-i}}\right)^{-1};$$

wherein $K_{F\text{-}i}$ represents particle stiffness of a i-th floor in the series model, and $\gamma_i$ represents a stiffness distribution coefficient of the i-th floor.

4. The integral reinforcement design method as claimed in claim 1, wherein in the step (2.2), the modified lateral stiffness $K_c$ of the external frame columns and the modified lateral stiffness $K_b$ of the external braces are calculated through the following formulas:

$$K_b = \eta \cdot (1-\lambda_b) \cdot \sin\theta_b \cos^2\theta_b \cdot \frac{E_b A_b}{h}, \quad K_c = \frac{12 E_c I_c}{h^3} \cdot \lambda_c;$$

wherein $\lambda_b$ represents an axial deformation coefficient of the external frame columns; $\lambda_c$ represents a bending deformation coefficient of the external frame beams; $\theta_b$ represents an angle between each of the external braces and a horizontal line, $\eta$ represents a stiffness reduction coefficient of the external brace, $E_b$ represents an elastic modulus of the external braces, $A_b$ represents a cross-section area of the external braces, $E_c$ represents an elastic modulus of the external frame columns, $I_c$ represents a moment of inertia of the external frame columns, and h represents a height of a floor of the original structure.

5. The integral reinforcement design method as claimed in claim 1, wherein the uncertain parameters in the step (3.1) comprise: a material, a load and a dimension, and the distribution characteristics comprise: a distribution type, a mean value and a standard deviation.

6. The integral reinforcement design method as claimed in claim 1, wherein the statistics in the step (3.4) comprise: a logarithmic mean value and a logarithmic standard deviation.

7. An integral reinforcement design method for an external frame-brace based on a random capability spectrum, comprising:
   (1) evaluating an original structure before reinforcement;
   (2) performing a reinforcement analysis on an external frame-brace sub structure to obtain a design scheme of the external frame-brace sub structure, specifically comprising:
      (2.1) calculating a difference between equivalent stiffness of the original structure and equivalent stiffness of a reinforced structure, and distributing particle stiffness to each floor of the original structure by usinga series model; wherein the external frame-brace sub structure is integrally connected to the original structure to obtain the reinforced structure
      (2.2) calculating modified lateral stiffness of external frame columns and modified lateral stiffness of external braces, and obtaining an initial reinforcement dimension and layout scheme of the external frame-brace sub structure; and
      (2.3) calculating a shear demand of the external frame columns and an axial force demand of the external braces, and designing the external frame columns, external frame nodes, and the external braces, as well as connections between components of the external frame-brace sub structure, and connections between the original structure and the external frame-brace sub structure, thereby obtain the design scheme of the external frame-brace sub structure; and
   (3) performing a reinforcement verification on the reinforced structure; wherein step (3) comprises:
      (3.1) counting distribution characteristics of uncertain parameters, and performing a random sampling on the distribution characteristics of the uncertain parameters to generate random model parameter values of the reinforced structure;
      (3.2) performing a pseudo status analysis on the reinforced structure to obtain a lateral force-displacement curve of the reinforced structure, and converting the lateral force-displacement curve of the reinforced structure to a capability spectrum acceleration-capability spectrum displacement curve of the reinforced structure;
      (3.3) obtaining, according to a structural seismic design requirement, an elastic-plastic response spectrum curve of the reinforced structure, and converting the elastic-plastic response spectrum curve of the reinforced structure to a demand spectrum acceleration-demand spectrum displacement curve of the reinforced structure;
      (3.4) obtaining random intersections between the capability spectrum acceleration-capability spectrum displacement curve of the reinforced structure and the demand spectrum acceleration-demand spectrum displacement curve of the reinforced structure, calculating statistics of the random intersections through a lognormal distribution hypothesis to generate a probability density curve $p(\cdot)$ and a cumulative distribution curve $F(\cdot)$;
      (3.5) calculating a target reinforcement displacement $S_{d\text{-}tar\text{-}RE}$ of the reinforced structure, and calculating an exceeding probability $P_f$ of the reinforced structure according to the target reinforcement displacement $S_{d\text{-}tar\text{-}RE}$ of the reinforced structure; and
      (3.6) comparing the exceeding probability $P_f$ of the reinforced structure to a target exceeding probability $P_{f\text{-}tar}$; determining, in response to the exceeding probability $P_f$ of the reinforced structure being smaller than the target exceeding probability $P_{f\text{-}tar}$, the reinforced structure satisfying a reset requirement and ending design of the external frame-brace sub structure; and executing, in response to the exceeding probability $P_f$ of the reinforced structure being larger than the target exceeding probability $P_{f\text{-}tar}$, the step (2) for repetition until the reinforced structure satisfies the preset requirement;
   (4) connecting, based on the design scheme of the external frame-brace sub structure, the external frame columns and external frame beans inpairs to form the external frame nodes, connecting an end of each of the external braces to a center of a corresponding one of the external frame beams, and connecting another end of each of the external braces to a corresponding one of the external frame nodes opposite to the corresponding external frame beam, to thereby form the external frame-brace sub structure; and connecting the external frame-brace sub structure to the original structure to reinforce the original structure.

\* \* \* \* \*